United States Patent [19]

Kraft

[11] Patent Number: 4,566,087
[45] Date of Patent: Jan. 21, 1986

[54] DIGITAL OPTICAL DISK SYSTEM

[75] Inventor: Crispin S. Kraft, Mill Valley, Calif.

[73] Assignee: Casdade Systems Incorporated, Mill Valley, Calif.

[21] Appl. No.: 613,082

[22] Filed: May 22, 1984

[51] Int. Cl.[4] .................. G11B 17/22; G11B 17/30
[52] U.S. Cl. ........................ 369/34; 369/36; 369/37
[58] Field of Search .............. 369/34, 36, 197, 35, 369/37, 40

[56] References Cited

U.S. PATENT DOCUMENTS

| 1,885,005 | 10/1932 | Daily | 369/197 |
|---|---|---|---|
| 2,994,856 | 8/1961 | Dickinson | 369/34 |
| 3,430,966 | 3/1969 | Gregg | 369/270 |
| 4,437,181 | 3/1984 | Kishima | 369/41 |

FOREIGN PATENT DOCUMENTS

| 33052 | 8/1981 | European Pat. Off. | 369/34 |

OTHER PUBLICATIONS

Bowdle, *Data Processing, System,* IBM Technical Disclosure Bulletin, vol. 3, No. 5, pp. 24-25.

Primary Examiner—Steven L. Stephan
Attorney, Agent, or Firm—Fitch, Even, Tabin & Flannery

[57] ABSTRACT

A mass memory storage device has a plurality of optical disks that the rotation axes of each disk being mounted equidistantly from a main axis. An arm is rotatably mounted about the main axis and is selectively positioned adjacent one of the addressed disks. A transducer head is carried on the distal end of the arm and is operably positioned adjacent an addressed track on the addressed disk. The arm may have two branches at its distal end where each branch carries a transducer head so that data can be read from and written to each side of the disk. Further, about each rotation axis of a disk, may be disposed a plurality of disk coaxially aligned to increase the storage capacity of the memory device.

18 Claims, 10 Drawing Figures

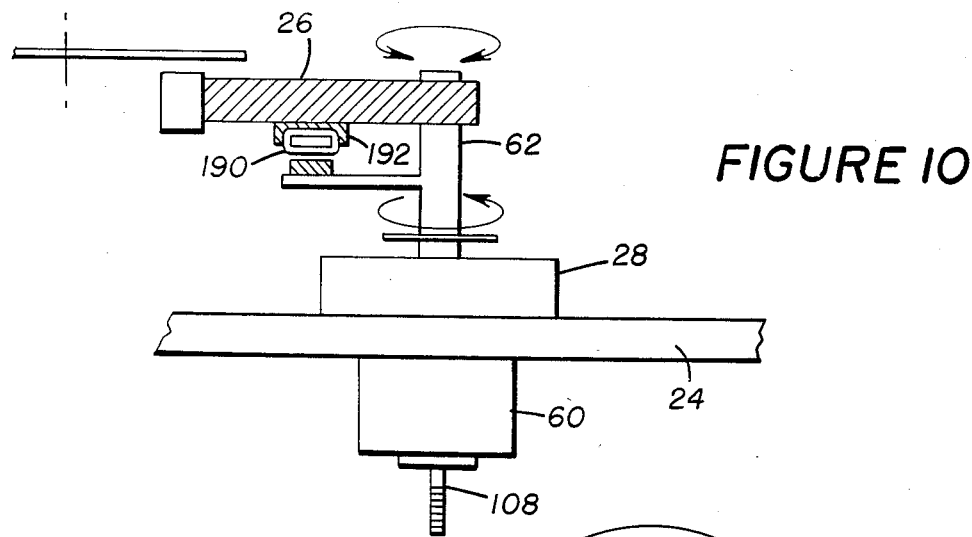
FIGURE 10
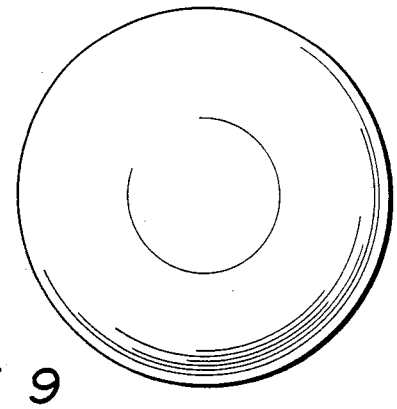
FIGURE 9
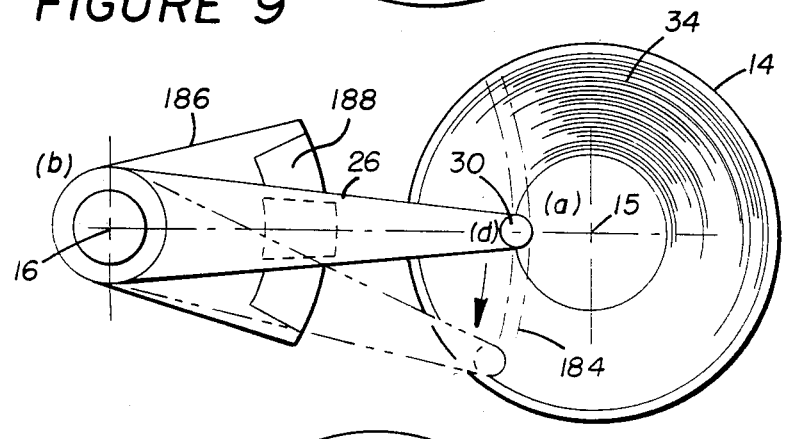
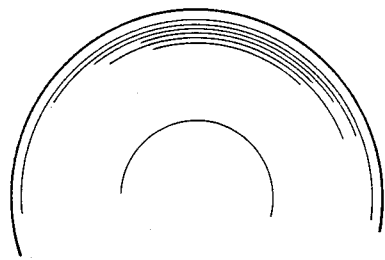

DIGITAL OPTICAL DISK SYSTEM

The present invention relates generally to digital optical disk memory systems and more particularly to such a system which incorporates a plurality of selectively accessible optical disks to provide a mass memory storage system.

BACKGROUND OF THE INVENTION

In large scale computer systems, it has become necessary to store great amounts of digital data into memory systems which need to have the capability of being randomly accessed. For example, a host computer may control a database system which is accessible by subscribers through remote computer terminals. The database system may for example contain information from diverse arts and disciplines. The database may be divided into general libraries, and each library divided into sublibraries or files. An example of one such library may include publication library wherein each of its files contain in digital form complete transcripts of a selected nationally known newspaper or periodical from the present and extending back in time for a given number of years. Another such library may include digital record of reported court cases wherein each file designates particular courts such as the U.S. Supreme Court or Federal Courts of Appeals. Presently, the size of each of the database files is only limited by the efforts to date of the database owner to compile and digitally translate numerous volumes of printed material. Another example of a database system includes a centralized random access database to support distributed computer aided design, manufacturing (CAD/CAM/CAE) capabilities of a manufacturing entity.

It is also desirable to minimize the overall dimensions of such memory systems. Digital optical disk memory systems have been the most promising for storing large quantities of data because of the large amount of data which can be digitally stored on a single disk. By incorporating many such disks into one memory device, one such memory device may store entire libraries of information.

A digital optical disk having a diameter of approximately 20 centimeters can presently hold around 0.5–0.7 gigabytes of information on one surface thereof. Systems have been developed in the prior art to automatically handle many such optical disks. Known systems may handle anywhere from between tens and hundreds of such optical disks. These systems are often called "juke box" systems and are based upon complex and sophisticated mechanics for performing through automatic loading and unloading of optical disks on one or more optical disk drives. The selection of the optical disk is made by addressing the memory device, which contains address decoders, to activate the mechanics and select the proper disk.

When the optical disk memory system is addressed, a dedicated robot first performs an automatic store or retrieve of a selected disk platter, the selection being indicated by the decoded address. Furthermore, the robot may also perform automatic loading and unloading of the optical disk on a selected one of several disk drives in the system.

One prior art system, known as a carousel juke box system, has an optical disk drive unit and a rotatable carousel for holding the optical disks associated therewith. The optical disks disposed in the carousel and held so that each disk defines the cross section of a toroid. When the disk drive unit is addressed, the toroid of optical disks is rotated so the addressed disk is placed into a selected position. A retrieval arm associated with the disk drive unit grabs the disk and places it on the disk drive unit.

Another prior art system is known as a linear juke box system. In the linear juke box system, a plurality of optical disks are stored face-to-face in one or more stacks. When addressed, a retrieval system will move adjacent to the proper stack and a retrieval arm thereof which then pull the addressed disk from the stack. The retrieval system then moves to place the optical disk held by the retrieval arm on a selected or free disk drive in the system. Such a system may have a plurality of optical disk drives so that retrieval and storage of one disk may be made while another disk is presently on a disk drive.

However, when the capacity of the optical disk memory system must be in the order of tens of gigabytes or greater and the random access time must be kept as low as possible, and very often in less than one second, the carousel and linear juke box system exhibit major disadvantages and limitations. One such disadvantage and limitation is that the access time is relatively slow due to the mechanical transportation of the disk within the system. Another disadvantage and limitation is that the system is vulnerable to mechanical failure. For example, a failure in the retrieval and storage mechanics of the memory system will place a large number of optical disks out of access. Furthermore, the very sophisticated disk handling mechanisms in such mass storage devices do not provide for a real time update of disk libraries. This is because to load and unload optical disks into and from the system becomes a slow procedure and very difficult to implement safe backup procedures.

SUMMARY OF THE INVENTION

According, it is an object of the present invention to overcome one or more of the disadvantages and limitations hereinabove enumerated.

It is an important object of the present invention to provide a disk to disk access time which is considerably less than access times known in the art.

It is a further object of the present invention to provide very high memory capacity and a minimum amount of volume of a disk drive system.

Another object of the present invention is to minimize the cost for fast access of on-line memory.

Yet another object of the present invention is to provide disk loading and unloading without interrupting the operation of the memory system.

According to the present invention, a mass memory storage device is adapted for receiving a plurality of optical data disks wherein each of the optical data disks has a plurality of concentric tracks about its axis. In the memory device, the disks are rotatably mounted radially from a main axis of the device and the rotation axis of each of the disks is disposed equidistantly form the main axis. The disks may be rotated either simultaneously or selectively when addressed. An arm is rotatably mounted about the main axis and is selectively positioned adjacent the addressed disk. A transducer head is carried on the distal end of the arm and is operably positioned adjacent a selected one of the tracks on the disk which has been addressed.

In another aspect of the present invention, the distal end of the arm may include two separate branches wherein each branch carries a transducer head. The branches are dimensioned so that when the arm accesses a selected disk, each branch is disposed adjacent an associated face of the data disk. Thus, data may be read or written to each side of the data disk.

In another aspect of the present invention, the arm is 180° rotatable about its own axis to selectively position the transducer head adjacent the obverse or reverse side of each data disk.

In another aspect of the present invention, each rotational axis of the disk may include a plurality of disks actually stacked therealong and separated from each other. The arm is actually translatable along the main axis to access different levels of disks along each rotation axis. Disk level axis may be made when the rotation of the arm itself is located between two adjacent disk axis.

These and other object, advantages and the features of the present invention will become more apparent from the following description and appended claims when read in conjunction with and reference to the accompanying drawings.

BRIEF DESCRIPTION OF THE DRAWINGS

FIGS. 9 and 10 illustrate another embodiment of a fine access positioning means to precisely access the tracks of an addressed disk in accordance with the principles of the present invention.

DETAILED DESCRIPTION OF THE DRAWINGS

Figure 1:
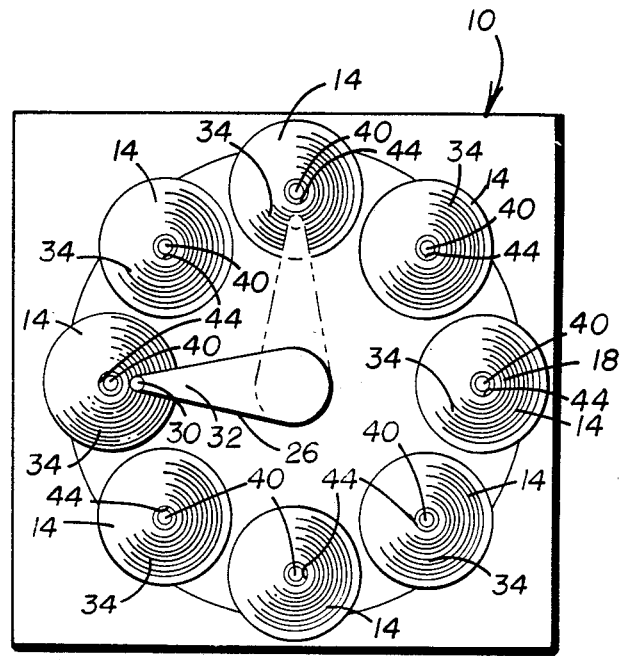
FIG. 1 and FIG. 2 diagrammatically illustrate a multi-disk memory system according to the principles of one embodiment of the present invention.
Figure 2:
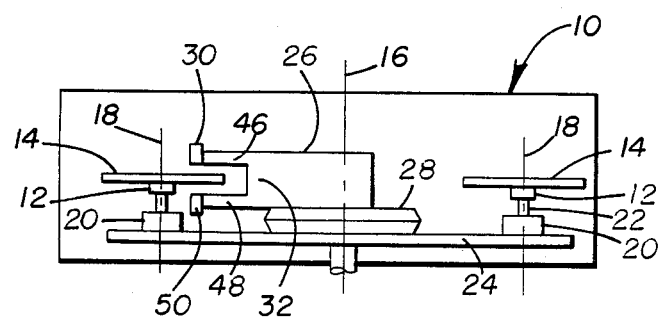

Referring now to FIGS. 1 and 2, there is diagrammatically shown an optical disk memory device 10 according to the principles of the present invention. Memory device 10 includes means 12 for mounting a plurality of disks 14 radially about a main axis 16. A rotation axis 18 of each of the optical disks 14 is radially disposed equidistantly from main axis 16. Means are provided for developing output rotational motion about axis 18 rotating each optical disk 14 by developing output rotational motion about each rotation axis 18.

In FIG. 2, it is illustrated that means includes a separate motor 20 and a drive shaft 22 associated with each optical disk 14. However, in another embodiment of the present invention, means for rotating optical disks 14 may include a single motor, similar to motor 20, disposed underneath a base plate 24. A drive shaft, similar to drive shaft 22, may extend along rotation axis 18 through base plate 24 and be rotatably mounted therein. A motor, disposed underneath base plate 24, may drive each drive shaft 22 by a belt driving means or other convenient means. In such an alternative embodiment of the present invention, each optical disk 14 would simultaneously be rotated, as compared to the illustrated embodiment in FIG. 2 wherein each optical disk 14 may be rotated only when it is being accessed.

To access each optical disk 14, an arm 26 is rotatably mounted to base plate 24 about main axis 16 and extends radially therefrom. A means 28 is provided for selectively positioning arm 26 adjacent one of optical disks 14. To read data from and write data to the selected optical disk 14, a transducer head 30 is carried on a distal end 32 of arm 26. Means, as hereinbelow described, are provided for operatively positioning transducer head 30 adjacent a selected one of the tracks 34 on the selected one of optical disks 14.

Commercially available optical disks are manufactured with a single spiral track on each side of the disk. Thus, there is only one "track" per side. However, for purposes of this specification, tracks 34 shall refer to each 360° segment of the spiral track and the number of such tracks is the number of track crossings along the radius of optical disk 14.

Figure 3:
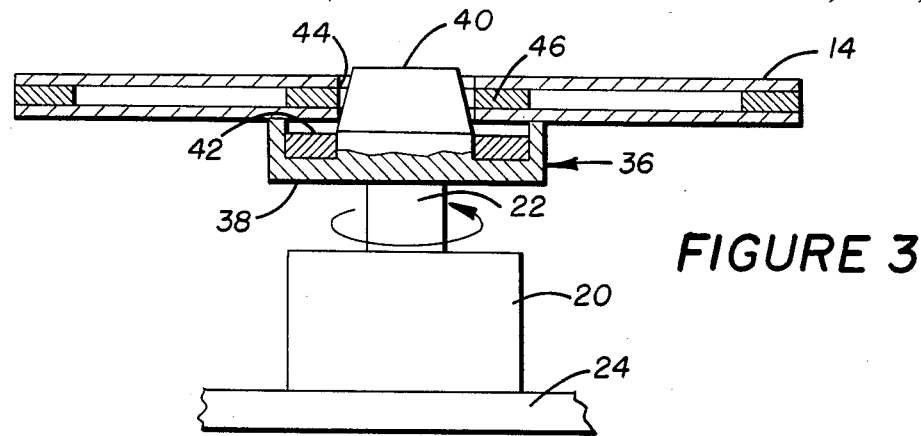
FIG. 3 illustrates how each optical disk is mounted in the memory system for quick loading and unloading.

With further reference to FIG. 3, each optical disk 14 is supported by a hub 36. Each hub 36 includes a backing plate 38, a positioning cone 40 and an annular magnet 42 disposed within backing plate 38. Positioning cone 40 extends outwardly from an upper face of backing plate 38 and is co-axial with the respective one of rotation axes 18. Each optical disk 14 has a central opening 44 and a metallic ring 46 disposed concentrically with central opening 44. Positioning cone 40 co-axially engages central opening 44. Annular magnet 42 is positioned for exerting a magnetic force on metallic ring 46 so that optical disk 14 is secured magnetically to hub 36. By magnetically securing each optical disk 14 to the associated hub 36, each optical disk 14 may be quickly loaded or unloaded from memory device 10 without disturbing or affecting the operation of other such optical disks 14 within the system. Also, the magnetic attachment eliminates unnecessary apparatus, such as the spindle and cone used to clamp floppy disks within a disk drive.

In one embodiment of the present invention, distal end 32 of arm 26 may include a first branch 46 and a second branch 48. First branch 46 is dimensioned to extend over an upper or obverse face of each optical disk 14 whereas second branch 48 is dimensioned to extend adjacent a lower or reverse face of each optical disk 14. Each optical disk 14 is then received within a channel between branch 46 and branch 48. In FIG. 2, it is illustrated that transducer head 30 is carried on upper branch 46 for reading data from and writing data to the obverse of a selected optical disk 14. Branch 48 carries a second transducer head 50 to read data from and write data to the reverse face of the selected optical disk 14.

Figure 4:
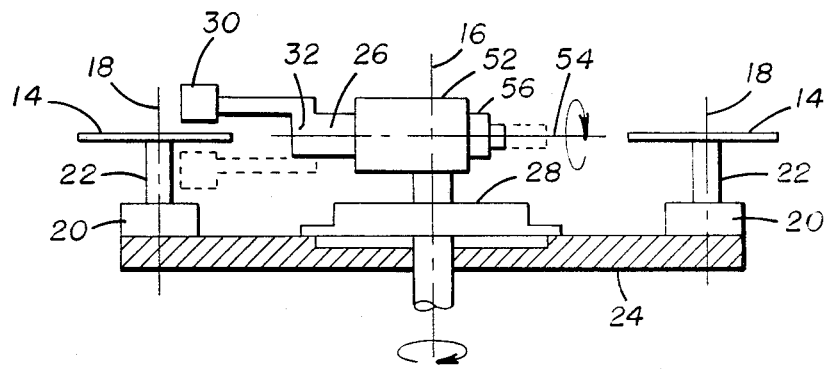
FIG. 4 illustrates yet another embodiment of a mass memory device according to the principles of the present invention.

Referring now to FIG. 4, there is shown an alternate embodiment of the present invention. Arm 26 includes only one branch at its distal end 32 and carries only one transducer head 30 and accesses only one side of a selected optical disk 14. However, means 52 are provided for rotating arm 26 180° about its axis 54. When arm 26 is positioned as illustrated in FIG. 4, and it is desired to position arm 32 into the lower position as is shown in phantom, arm 26 is positioned to a point midway between the rotation axes 18 of two adjacent optical disks 14. In such position, rotating means 52 may rotate arm 26 180° about its axis 54. Furthermore, means 56 are also provided to axially translate arm 26 about its axis 54 to provide clearance for transducer head 30 away from optical disk 14 as rotating means 52 is rotating arm 26. Rotating means 52 and translating means 56 are linear motors similar in construction and operation of other linear motors described hereinbelow in greater detail.

Figure 5:
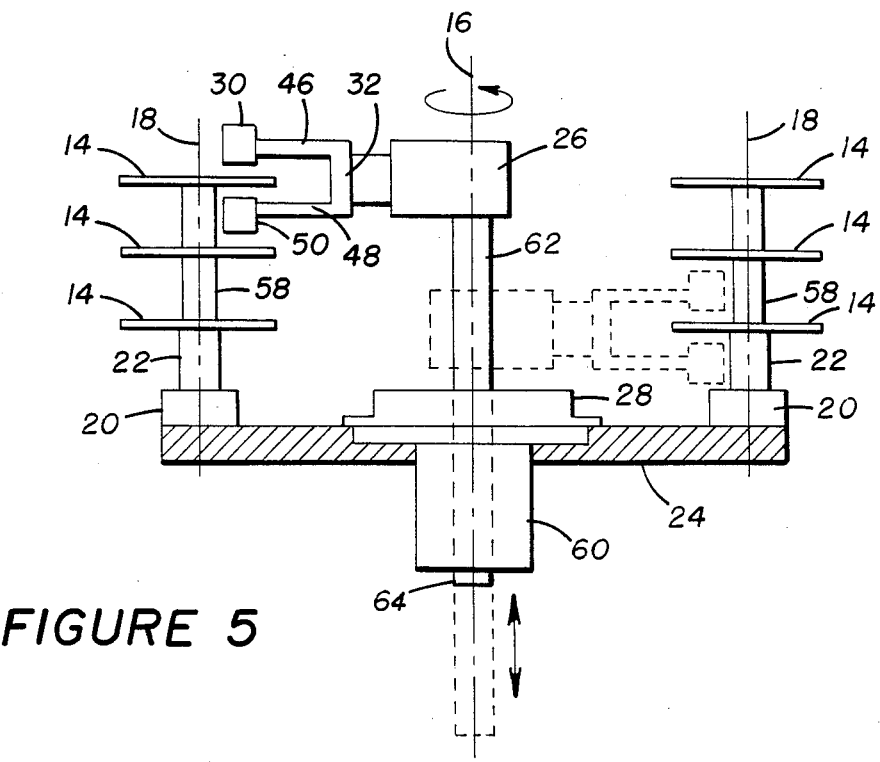
FIG. 5 illustrates yet another embodiment of a mass memory storage device according to the principles of the present invention.

Referring also now to FIG. 5, another embodiment of the present invention is illustrated. In FIG. 5 it is shown that a plurality of optical disks 14 may also be stacked along rotation axis 18. A spindle 58 extends axially along an associated one of each rotation axis 18 and couples a plurality of optical disks in a spaced apart relationship with each other. The distance between each optical disk 14 in the stack along each rotation axis 18 is selected to be sufficient to provide clearance for transducer heads 30 and 50. In the embodiment illustrated in FIG. 5, memory device 10 includes means 60 for axially translating arm 26 along main axis 16. A drive shaft 62 is coupled to arm 26 along axis 16. Rotational movement to drive shaft 62 is provided by rotating means 28 as hereinabove described. Drive shaft 62 extends through base plate 22 and a lower end 64 thereof projects downwardly from the bottom of base plate 24. Translating means 60 acts on lower end 64 to axially displace drive shaft 62. Thus, a selected one of optical disks 14 may be addressed by determining the radial and axial position of arm 26. Translating means 60 is hereinbelow described in greater detail.

The above three basic embodiments of the present invention may also be combined in any obvious combination. For example, the rotatable arm illustrated in FIG. 4 may also be used with the stacked optical disk system illustrated in FIG. 5. Also, the rotating means for the optical disk 14 in FIGS. 4 and 5 need not be the individual rotating means 20 associated with each rotation axis 18 but may also be a single rotating means disposed below base plate 24 and operatively coupled, such as by a belt drive means, to drive shafts 22 which would also extend through base plate 24.

Figure 6:
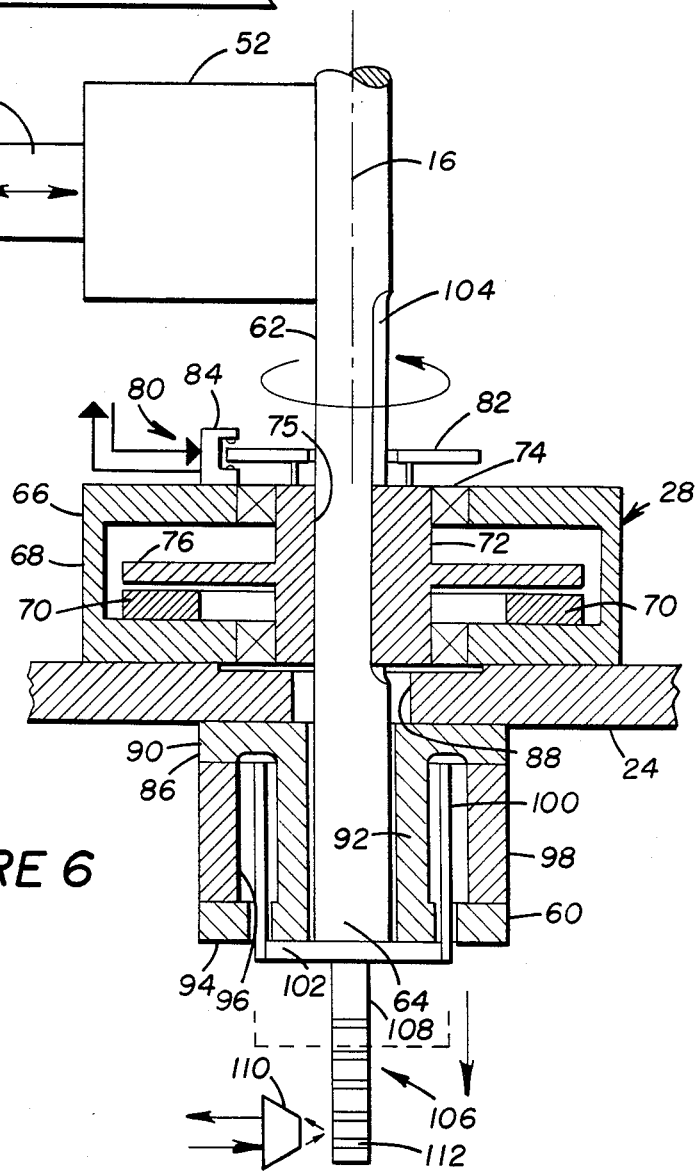
FIG. 6 illustrates how arm position may be controlled for selected disk access in each of the above embodiments of the present invention.

Referring now to FIG. 6 there is shown in greater detail the rotating means 28 illustrated in FIGS. 1-5, and the translating means 60 illustrated in FIG. 5. Of course, as hereinabove described, rotating means 28 is provided in all embodiments of the present invention, whereas the translating means 60 is provided only where a plurality of optical disks 14 are stacked along a common rotation axis 18 as illustrated in FIG. 5.

Rotating means 28 includes an electric motor 66 having a housing 68, a stator 70, and a rotor 72. A pair of bearing means 74 are provided for rotatably mounting rotor 72 within housing 68. Rotor 72 further includes an opening 75 therethrough dimensioned to receive drive shaft 62 to impart the output rotational motion of motor 66 to drive shaft 62 and arm 26. Housing 68 is mounted to base plate 24.

Motor 66 is a conventional DC motor wherein magnets 70 provide the poles and are disposed adjacent rotating rotor coil windings 76 which are electrically switched by conventional means known in the electromechanical arts for DC motors between the positive and negative poles of a source of DC potential, to alternate the magnetic fields between rotor windings 76 and magnet 70 to impart rotational motion to rotor 72.

Arm positioning means 28 further includes encoder means 80 for determining the radial position of arm 26 with respect where reference radial position about main axis 16. Encoder means 80 includes an encoder member 82 and a sensor 84. Encoder 82 is rotatable about main axis 16 and, in one embodiment of the present invention, is coupled to rotor 72 so that its position is radially fixed with respect to arm 26 and rotates therewith. Encoder 82 has radial position indicia thereon disposed proximate to its circumferential edge to indicate the radial position of arm 26 with respect to a reference radial position. Sensor 84 is mounted to housing 68 of motor 66. Of course, any mounting of sensor 84 which enables it to remain stationary with respect to encoder 82 is possible. Sensor 84 in response to the indicia on encoder 82 indicates the radial position of encoder 82 and thus, the radial position of arm 26. Encoder means 80 may be any commercially available shaft encoder which determines angular position.

In the embodiment of the present invention wherein arm 26 is axially translatable along main axis 16, translating means 60 are provided. Translating means 60 includes a linear DC motor 86 mounted to an underside of face plate 24 in an axial relationship with drive shaft 62. Drive shaft 62 extends through an opening 88 of base plate 24. Linear motor 86 is a conventional DC linear motor which includes an annular housing 90 having an inner axially extending member 92 dimensioned to receive lower end portion 64 of drive shaft 62 and an outer axially extending member 94, defining a generally toroidal opening 96 between inner member 92 and outer member 94. Outer member 94 carries an annular magnet 98. Received within opening 96 is a cylindrical coil winding 100 which is attached to a radial flange 102 at lower end portion 64 of drive shaft 62. By applying a DC current to coil winding 100, the magnetic field developed by coil winding 100 interacts with the magnetic field developed by magnet 98 causing coil winding 100 to translate axially through opening 96 and with respect to main axis 16. Thus, drive shaft 62, being coupled to coil winding 100, is also axially translatable along main axis 16.

When memory device 10 includes the embodiment of the present invention illustrated in FIG. 5, drive shaft 62 further includes an axial slot 104 in which rotor 72 of motor 66 is received. Slot 104 provides for mounting rotor 72 to drive shaft 62 in axially slidable engagement while remaining angularly fixed thereto.

In order to determine the axial position of arm 26, an encoder means 106 is disposed beneath lower end portion 61 of drive shaft 62. Axial position encoder means includes an encoder 108 axially projecting from lower end portion 64 and an opto-electrical sensor 110. Encoder 108 includes a plurality of optical indicia 112 thereon which establish the axial position of drive shaft 62. Opto-electrical sensor 110 optically detects indicia 112 and indicates the axial position of drive shaft 62. Opto-electrical sensor 110 in one embodiment of the present invention may develop an electrical signal which is either analog or digital to indicate position in response to the optical indicia.

Figure 7:
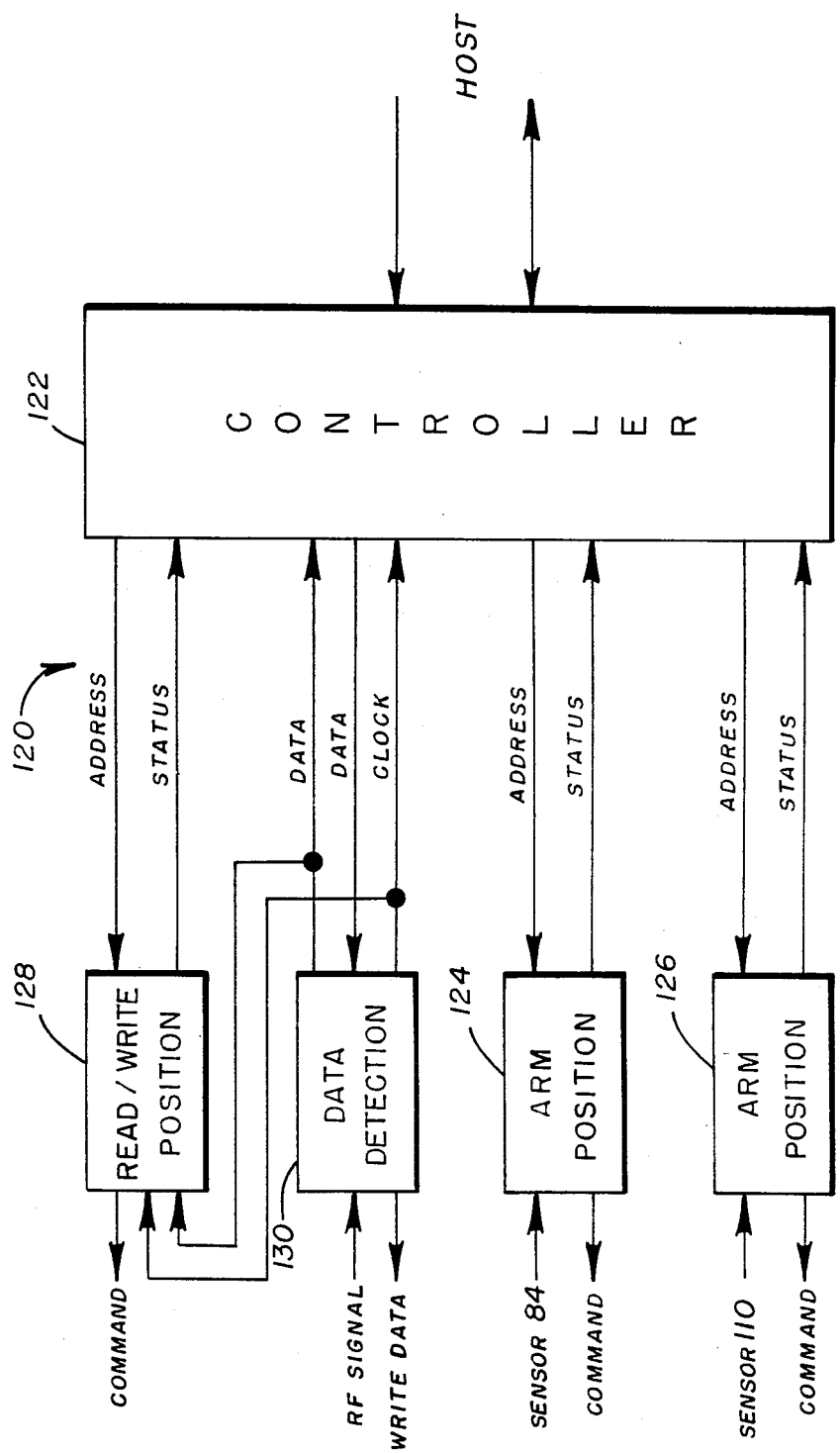
FIG. 7 is a schematic block diagram illustrating the controlling of the position of the arm.

Referring now to FIG. 7, there is shown a schematic block diagram illustrating the control means which is responsive to a host computer for performing disk access and track access. Control means 120 includes a controller 122 which in response to address and control signals from the host computer (not shown) controls the angular position of arm 26 through an arm position controller 124 and the axial position of arm 26, in the embodiment of the present invention described with reference to FIG. 5, through an arm position controller 126. For example, an address developed by the host computer is applied to controller 122. Controller 122 then decodes selected first bits of the address wherein the selected first bits indicate the angular position of rotation axis 18 associated with a selected one of the optical disks 14 which is to be accessed. When there is only one optical disk 14 for each rotation axis 18, controller 122 in response to the decoding of the first selected bits applies an angular position address signal to arm position controller 124. The angular address signal contains information of the angular position of the addressed optical disk 14. Arm position controller 124 in response to the address signal determines the angular positioin of the addressed one of optical disks 14 and reads the angular position of arm 26 determined by sensor 84. Sensor 84 develops either an analog or digital signal which applied to arm position controller 124 wherein such signal indicates the present angular position of arm 26. If the angular position indicated by sensor 84 and the desired angular position indicated by the address signal applied to arm position controller 124 by controller 122 do not coincide, arm position controller 124 commands positioning means 28 to rotate arm 26 into a position wherein the position indicated by the selected first ones of the address bits and its angular position indicated by sensor 84 coincide. In one embodiment of the present invention, arm position controller 124 develops a command signal which is applied to motor 66 for selectively energizing motor 66 and removes the command signal when the desired angular position of arm 26 has been obtained. Arm position controller 124 develops a feedback signal which is applied to controller 122 to indicate that arm 26 is in a proper position adjacent a selected one of the optical disks 14. Controller 122 is responsive to the feedback status signal to initiate further steps in the acquisition or writing of data from or to the addressed optical disk 14.

When memory device 10 includes an axially translatable arm 26, as illustrated in FIG. 5, controller 122 decodes selected second ones of the address bits of the address applied thereto by the host computer. Controller 122 in response to the decoding of the selected second ones of the address bits applies to a level position address signal to arm position controller 126. The level position address signal contains information of the level along one rotation axis 18 of the addressed optical disk 14. Arm position controller 126, in response to the level position address signal, reads the level of arm 26 determined by sensor 110 and axially translates arm 26 until the position indicator by sensor 110 coincides with the position indicated by the second selected ones of the address bits. More particularly, controller 122 decodes the second selected ones of the address bits and develops an analog or digital signal which applied to arm position controller 126. If the signal developed by sensor 110 does not coincide with the position signal developed by controller 122, arm position controller 126 develops a command signal which is applied to linear motor 86 for axially translating drive shaft 62. The polarity of the command signal determines the axial direction of translation of drive shaft 62. When the signal developed by sensor 110 coincides with the signal developed by controller 122, arm position controller 126 removes the command signal from linear motor 86 to stop axial translation of drive shaft 62.

When arm 26 has been positioned against the selected one of the optical disk 14, transducer head 30 or 50 must be operatively positioned adjacent a selected one of the tracks on the selected optical disk 14. A read/write position controller 128 is coupled in a well known servo-loop with controller 122 and transducer head 30 or 50. Controller 122 decodes selected third ones of the address bits which indicate the selected one of the tracks on the selected optical disk 14. Read/write position controller 128 is responsive to the decoding of the third selected ones of the address bits for positioning transducer head 30 or 50. More particularly, controller 122 develops an analog or digital signal in response to the decoding of the third selected ones of the address bits, the signal being applied to read/write position controller 128. Transducer heads 30 or 50 is reading data from the selected optical disk 14 to determine the track presently adjacent transducer head 30 or 50. Read/write position controller 128 develops the command signal applied to a stepper motor for stepping the position of transducer head 30 or 50 until transducer head 30 or 50 is adjacent the selected track 34. Read/write position controller 128 compares the signal developed by controller 122 in response to decoding the third selected ones of the address bits to a signal developed by data detection circuit 130 which detects an RF signal developed by transducer head 30 or 50.

Controller 122 is further responsive to selected fourth ones of the address bits for selecting a particular data field within the selected track. Data detection circuit 130 is responsive to the decoding of the selected fourth ones of the address bits by controller 122. More particularly, data detection circuit 130 decodes the incoming RF signal from transducer head 30 or 50 and compares the address fields detected in the selected track with an analog or digital signal developed by controller 122 which is developed in response to decoding of the four selected address bits. When the decoded RF signal and the signal developed by controller 122 coincide, data detection circuit 130 develops a command signal which applied to transducer head 30 or 50 to read or write data from the data fields which is associated with the address field in the particular addressable location and the selected track. Data detection circuit 130 also applies a clock signal to controller 122 to synchronize the data being applied to controller 122.

Figure 8:
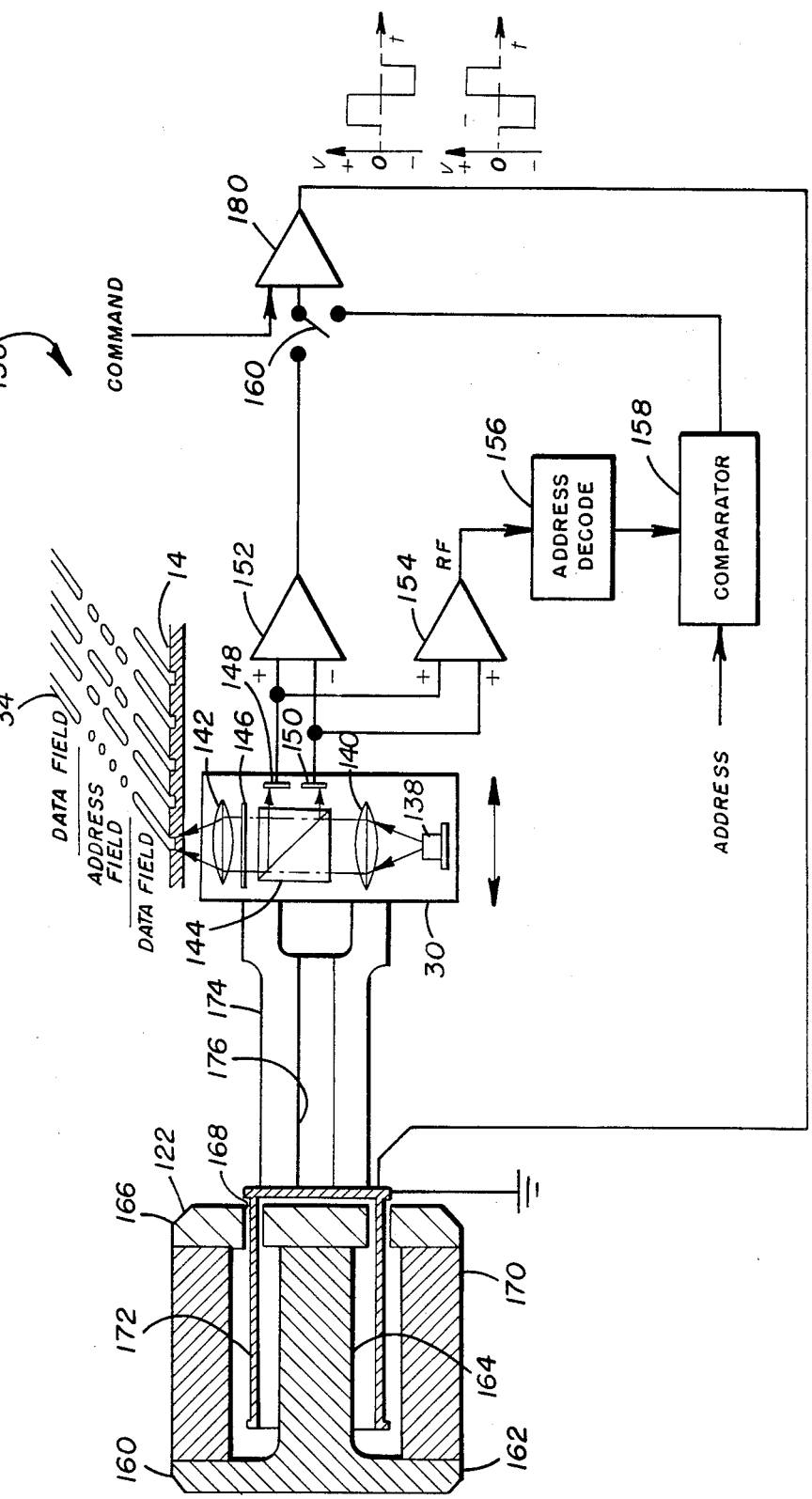
FIG. 8 illustrates one embodiment of a fine access positioning means to precisely access the tracks on an addressed disk in accordance with the principles of the present invention.

Referring now to FIG. 8 there is shown a fine axis actuator means for precise positioning of transducer head 30 or 50 adjacent a selected one of tracks 34. In digital optical disk systems, a laser beam is used to read data from and write data to the individual tracks 34. The preciseness of the beam and the fineness and density of tracks 34 require that the transducer head be accurately located. Typically, transducer head 30 (the description of which also refers to transducer head 50) includes a source 138 of laser light and a first lens 140 which collimates the laser beam. Transducer head 30 further includes a second lens 142 which focuses the laser beam on a selected one of tracks 34. Depending upon the data stored, the laser beam is either absorbed or reflected by the optical polarization within the selected one of tracks 34. If the beam is reflected, lens 142 collimates the beam which is reflected back to a beam splitter 144. A quarter wavelength filter 146 is disposed in the optical path between lens 142 and beam splitter 144. Beam splitter 144 develops two separate optical beams. A first one of the beams is incident upon a first photo cell 148 and the second beam is incident upon a second photo cell 150. Photo cells 148 and 150 are arranged to convert the light energy from opposite edges of the optical beam into radio frequency signal. For example, when transducer head 30 is offset to the left with respect to the illustrated one of tracks 34 and the polarization of the data reflects the optical beam back to beam splitter 144, the beam intensity incident upon photo cell 150 will be greater than the beam intensity upon photo cell 148. Thus, the amplitude of the electrical RF signal developed by photo cell 150 will be greater than the amplitude of the RF signal developed by photo cell 148.

Fine axis positioning means 136 includes a comparator 152 which compares the amplitudes of the RF signals and develops an error signal whose polarity indicates the offset of transducer head from the selected one of tracks 34 and whose amplitude indicates the distance which transducer head 30 is offset from the selected one of tracks 34. In the example above given, the error signal would have a negative polarity to indicate that transducer head 30 was offset to the left of tracks 34. Of course, the polarity of the error signal is an obvious choice of design and need not be as above described. Thus, fine axis positioning means 136 provides means for allowing transducer head 30 or 50 for following the spiral runout of each track 34.

The electrical signals developed by photo cells 148 and 150 are also applied to an amplifier 154 which sums the amplitudes of the signals developed by photo cells 148 and 150. The output of amplifier 154 is an RF signal which contains information of the data within the data fields of the select one of the tracks and the addresses within the address fields of the selected one of the tracks. The RF signal is applied to an address decoder 156 of fine access positioning means 136 which decodes the RF signal and develops the signal indicating the address indicated by the address field within the track. A comparator 158 of fine access positioning means 136 is responsive the decoded address developed by address decoder 156 and to present address applied thereto from the host computer. Comparator 158 compares the address state and develops the signal. An amplifier of access positioning means 136 is switchable between the output of comparator 158 and the output of comparator 152 by means of a switch 160.

Fine access positioning means 136 further includes a linear motor 160 which is mounted to arm 26. Linear motor 160 includes a housing 162 mounted to arm 26. Housing 162 includes a cylindrical core 164 and an outer cylindrical member 166 which defines a toroidal shape chamber 168 therein between. A magnet 170 is carried in linear motor 160 further includes a cylindrical coil 172 received within chamber 168. Transducer head 30 is mounted to coil 172 by an arm 174 which has a track 176 therein for mounting arm 174 to arm 26 in linear slidable engagement.

Fine axis positioning means 136 further includes an amplifier 180 which develops an output signal, as represented by one of the voltage waveforms illustrated in FIG. 8, to energize coil 172 to position transducer head 30. When switch 160 is coupled to the output of comparator 158, the difference between the address state developed by the host computer and address decoder 156 across amplifier 180 to develop a voltage whose amplitude will determine the magnitude of translation of transducer head 30 in accordance with the amplitude of the voltage applied to coil 172 and its initial polarity will indicate the direction of translation. The voltage reverses polarity, as shown, to provide de-acceleration of linear motor 160. When the output of comparator 158 goes to zero, it is indicated that the address developed by the host computer and address decoder 156 coincide and the proper track has been selected by the output of amplifier 180 goes removing current from coil 172 stopping translation of transducer head 30.

Switch 160 is then coupled output of comparator 152 to an input of amplifier 180 for fine access control. Amplifier 180 amplifies the air signal, and the polarity of the current through coil 172 determined by the error signal will cause transducer head 30 to move in a direction indicated by such polarity so that the laser beam is focused into the center of the track. The amplitude of the current through coil 172 determined by the error signal determines the magnitude of translation of transducer head 30. Thus, when transducer head 30 centers the laser beam within the selected one of tracks 34, the error signal goes to zero thereby moving current from coil 172 and stopping motion of transducer head 30. of course, transducer head 30 or 50 is always being positioned in response to the output of comparator 152 to follow the radial runout of the selected track 34. If the transducer head 30 or 50 is to remain on the selected track 34, a micro-jump command signal is synchroniously applied to amplifier 180 every 360° of rotation of disk 14 to return transducer head 30 or 50 to the beginning of the 360° segment defining track 34.

Referring now to FIGS. 9 and 10 there is illustrated an alternative embodiment of the present invention for performing fine access to selected ones of tracks 34 and a selected optical disk 14. Instead of having fine access to the tracks being radial to the rotation axis of the selected one of optical disk 14, the fine access is performed by providing means which allow arm 26 to follow an arc 184 which intersects the tracks 34 of the selected one of the optical disk 14. As best seen in FIG. 8, arm 26 is shown positioned along the line which intersects both main axis 16 and the rotation axis 18. It is also shown that arm 26 is rotatable through an arc radial with main axis 16 so that transducer head 30 or 50 cuts across tracks 34 of the selected optical disk 14.

In the alternate embodiment, arm 26 is also rotatable about drive shaft 62. Connected to drive shaft 62 beneath arm 26 is a platform 186 which extends radially outwardly from drive shaft 62. A magnet 188 is carried at a distal end of platform 186 and is of arcuate shape. A coil 190 is carried on the underside of arm 26 and disposed above magnet 188. While 190 is carried by a mounting member 192 attached to arm 26. By applying a current to coil 190, its magnetic field will interact with the magnetic field of magnet 188 to cause arm 26 to move in angular direction with respect to platform 186. When memory device 10 receives an address from the host computer and the position of arm 26 has to be moved to be in line with different rotation axis 18, a current is applied to coil 190 to electrically fix its position within a midpoint of platform 186. Positioning means 28 then angularly positions coil adjacent the selected one of optical disk 14. To access the selected tracks on the selected disk 14, an apparatus similar to the apparatus disclosed in FIG. 8 is utilized to develop a signal which is a comparison between the address from the host computer and the address developed by address decoder 156. The signal is applied to coil 190 so that arm 26 angularly rotates about drive shaft 62 until the track with the selected address field is located. At this point, switch 160 then couple the error signal developed by amplifier 152 to amplifier 180, and the output signal of amplifier 180 being applied to coil 190 said fine access to the selected track is made as hereinabove described. The fine access positioning means illustrated in FIGS. 8 and 9 may be used with any embodiment of the above-described invention of FIGS. 1-5.

There has been disclosed hereinabove particular embodiments of a digital optical disk system. Those skilled in the art may now make numerous uses of and modifications to the disclosed embodiments without departing from the inventive concepts herein. Accordingly, the present invention is to be defined and limited solely by the scope of the appended claims.

What is claimed is:

1. A memory disk system adapted for receiving a plurality of data disks, each of said disks having an obverse face, a reverse face, and a plurality of tracks on at least one said faces said memory disk system comprising:
    means for rotatably mounting said plurality of disks radially from a main axis, the rotation axis of each of said disks being radially disposed equidistantly from and parallel to said main axis;
    means for rotating each of said disks about its axis;
    an arm rotatably mounted about said main axis and extending radially therefrom;
    means for positioning said arm adjacent a selected one of said disks;
    a transducer head carried on a distal end of said arm; and
    means for operatively positioning said transducer head adjacent a selected one of said tracks on said one of said disks.

2. A memory disk system as set forth in claim 1 wherein said mounting means includes:
    a hub having a backing plate, a positioning cone extending outwardly from a face of said backing plate, and an annular magnet disposed within said backing plate concentrically about said positioning cone, said positioning cone being adapted for coaxially engaging a center opening of an associated one of said disks, said magnet being positioned for magnetically securing a metallic ring disposed about the center opening of said associated one of said disks.

3. A memory disk system as set forth in claim 2 wherein said rotating means includes:
    a motor associated with each said hub and coupled thereto to impart rotational motion developed by said motor to said hub.

4. A memory disk system as set forth in claim 1 wherein said arm positioning means includes:
    a motor which develops output rotational motion about said main axis and being operatively coupled to said arm;
    encoder means for determining the angular position of said arm with respect to a reference angular position about said axis; and
    means for selectively energizing said motor to position said arm at a predetermined angular position along which said axis of said one of said disks is disposed, said energizing means disabling said motor is response to said encoder means determining that said arm has been rotated to said predetermined angular position.

5. A memory disk system as set forth in claim 4 wherein said encoder means includes:
    an encoder member rotatable about said main axis and operatively coupled to the output rotational motion of said motor and being radially fixed with respect to said arm and having radial position indicia thereon indicating radial position with respect to said reference radial position; and
    a stationary sensor which in response to said indicia indicates the radial position of said encoder member.

6. A memory disk system as set forth in claim 1 wherein said transducer head positioning means includes:
    means for mounting said transducer head in linear slidable engagement on said distal end of said arm;
    encoder means for determining the present position of said transducer head on said arm with respect the selected position of said transducer head when operatively adjacent said selected one of said track; and
    means responsive to said encoder means for moving said transducer head along said arm in discrete steps, each step corresponding to the distance between adjacent ones of said tracks, the number of steps being determined by the difference between the present position and the selected position of said transducer head.

7. A memory disk system as set forth in claim 1 wherein said mounting means includes means for mounting a plurality of disks in a spaced apart facing relationship about each rotation axis and wherein said arm is axially slidably mounted along said main axis.

8. A memory disk system as set forth in claim 7 wherein said arm positioning means includes means for selectively translating said arm axially along said main axis when said arm is radially disposed between the radial positions of two adjacent rotation axes.

9. A memory disk system as set forth in claim 1 wherein said arm includes:
    means for rotating said arm about its axis to selectively position said transducer head adjacent one of said obverse face and said reverse face on said one of said disks.

10. A memory disk system as set forth in claim 1 wherein said disks are optically readably and writeable disks.

11. A memory disk system comprising:
    a plurality of information carrying disks, each of said disks having an obverse face, a reverse face and a plurality of tracks disposed on one said faces in which information is stored and being rotatable about its axis, the rotation axis of each of said disk being radially disposed equidistantly from and parallel to a main axis;
    means for rotating each of said disks about its axis;
    an arm rotatably mounted about said main axis and extending radially therefrom;
    means for positioning said arm adjacent a selected one of said disks;
    a transducer head carried on a distal end of said arm; and
    means for opertively positioning said transducer head adjacent a selected one of said tracks on said one of said disks.

12. A memory disk system as set forth in claim 11 wherein said mounting means includes means for mounting a pluraltiy of disks in a spaced apart facing relationship about each rotation axis and wherein said arm is axially slidably mounted along said main axis.

13. A memory disk system as set forth in claim 12 wherein said arm positioning means includes means for selectively translating said arm axially along said main axis when said arm is radially disposed between the radial positions of two adjacent rotation axes.

14. A memory disk system as set forth in claim 11 wherein said arm includes:
   means for rotating said arm along its axis to selectively position said transducer head adjacent one of said obverse face and said reverse face on said one of said disks.

15. A memory disk system as set forth in claim 11 wherein said disks are optically readably and writeable disks.

16. In a data processing system having a central processing unit and a plurality of date disks, each of said data disks having a plurality of tracks about an axis thereof, each of said tracks having a plurality of addressable locations, each of said addressable locations having an address field and a data field, said central processing unit having means for developing an address word for addressing a selected one of said addressable locations and means for selectably reading data from and writing data to said data field of said selected one of said addressable locations when said address field thereof is addressed, said address word having a plurality of address bits, a memory disk system comprising:
   means for mounting said plurality of data disks radially from a main axis, the rotation axis of each of said disks being disposed equidistantly from and parallel to said central axis;
   means for rotating each of said disks about its axis;
   an arm rotatably mounted about said main axis and extending radially therefrom;
   means responsive to the state of selected first one of said address bits for selectively positioning said arm adjacent one of said disks which is identified by the state of said selected first ones of said address bits;
   a transducer head carried on a distal end of said arm;
   means responsive to the state of selected second ones of said address bits for operatively positioning said transducer head adjacent a selected one of said tracks on said one of said disks said selected one of said tracks being identified by the state of said selected second ones of said address bits; and
   means responsive to the state of selected third ones of said address bits for addressing said address field of a selected one of said addressable locations identified by the state of said third ones of said address bits, said reading and writing means being selectively operative to read data from and write data to said data field of said selected one of said addressable locations through said transducer head.

17. A memory disk system as set forth in claim 16 wherein said mounting means includes means for mounting a plurality of disks in a spaced apart facing relationship about each rotation axis and wherein said arm is axially slidably mounted along said main axis.

18. A memory disk system as set forth in claim 17 which further includes:
   means responsive to the state of selected fourth ones of said address bits for selectively translating said arm axially along said main axis to level which is identified by the state of said selected fourth ones of said address bits.

* * * * *